(12) United States Patent
Giraud et al.

(10) Patent No.: US 12,251,018 B2
(45) Date of Patent: **\*Mar. 18, 2025**

(54) SEALING CORNER BRACKET AND CABINET INCLUDING CORNER BRACKET

(71) Applicant: CORNING RESEARCH & DEVELOPMENT CORPORATION, Corning, NY (US)

(72) Inventors: William Julius McPhil Giraud, Azle, TX (US); Brian Duane Kingsbury, Watauga, TX (US); Robert Tomasz Klak, Zdunska Wola (PL)

(73) Assignee: Corning Research & Development Corporation, Corning, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,729

(22) Filed: Dec. 21, 2023

(65) Prior Publication Data

US 2024/0115044 A1 Apr. 11, 2024

Related U.S. Application Data

(63) Continuation of application No. 17/030,908, filed on Sep. 24, 2020, now Pat. No. 11,857,074, which is a
(Continued)

(51) Int. Cl.
*A47B 96/06* (2006.01)
*A47B 47/00* (2006.01)
*F16B 12/44* (2006.01)

(52) U.S. Cl.
CPC .......... *A47B 96/06* (2013.01); *A47B 47/0008* (2013.01); *F16B 12/44* (2013.01)

(58) Field of Classification Search
CPC ..... A47B 96/06; A47B 47/0008; F16B 12/44; F16B 2012/446
See application file for complete search history.

(56) References Cited

U.S. PATENT DOCUMENTS 3,144,265 A * 8/1964 Humble ............. A47B 47/0008
403/219
4,954,007 A * 9/1990 Pinney ................... A47B 47/02
403/219
(Continued)

FOREIGN PATENT DOCUMENTS

EP 3706599 A1 9/2020
WO 2019/108525 A1 6/2019

OTHER PUBLICATIONS

European Patent Application No. 19725787.6, Office Action dated Jul. 8, 2022; 5 pages; European Patent Office.
(Continued)

*Primary Examiner* — Daniel J Rohrhoff

(57) ABSTRACT

A corner bracket may include a structural portion including at least one relatively rigid first material, and a sealing portion including at least one relatively elastic second material. The corner bracket may also include a first receiver including a first retainer portion configured to be coupled to an end of a first frame member, and a first sealing interface configured to provide a substantially fluid-resistant seal between a portion of the end of the first frame member and the first receiver. The corner bracket may also include a second receiver transverse to the first receiver and including a second retainer portion configured to be coupled to an end of a second frame member, and a second sealing interface configured to provide a substantially fluid-resistant seal between a portion of the end of the second frame member and the second receiver. The corner bracket may be incorporated into a cabinet frame.

20 Claims, 8 Drawing Sheets

Related U.S. Application Data continuation of application No. PCT/US2019/024908, filed on Mar. 29, 2019.

(60) Provisional application No. 62/652,708, filed on Apr. 4, 2018.

(56) References Cited

U.S. PATENT DOCUMENTS

| | | | | |
|---|---|---|---|---|
| 5,451,115 | A * | 9/1995 | Sayres | E04B 1/5831 403/372 |
| 6,223,917 | B1 * | 5/2001 | Bruder | A47B 47/0008 403/231 |
| 9,004,715 | B1 * | 4/2015 | Litke | A47F 3/001 362/218 |
| 10,309,680 | B2 * | 6/2019 | Ling | F24F 13/0263 |
| 10,595,442 | B2 * | 3/2020 | Davis | H05K 7/20745 |
| 11,857,074 | B2 * | 1/2024 | Giraud | H04Q 1/02 |
| 2012/0068586 | A1 * | 3/2012 | Chen | H04Q 1/09 312/223.4 |
| 2014/0008192 | A1 | 1/2014 | Christophy et al. | |
| 2014/0050344 | A1 | 2/2014 | Hilderman et al. | |
| 2014/0294500 | A1 * | 10/2014 | Schaaf | H02B 1/301 403/403 |
| 2016/0073525 | A1 * | 3/2016 | Maloney | H05K 7/183 312/223.1 |
| 2017/0097030 | A1 * | 4/2017 | Keller | A47B 47/0008 |
| 2021/0341005 | A1 * | 11/2021 | Suzuki | A47B 47/0008 |
| 2023/0165366 | A1 | 6/2023 | Abedijaberi et al. | |

OTHER PUBLICATIONS

International Search Report and Written Opinion of the International Searching Authority; PCT/US2019/024908; Mailed Jul. 23, 2019; 14 Pages; European Patent Office.

Jon Gelston: "Tips for Waterproofing an Electronic Enclosure", Nov. 30, 2016, XP055602052, Retrieved from the Internet: URL:http://www.aimprocessing.com/blog/tips-for-waterproofing-an-electronic-enclosure [retrieved on Jul. 3, 2019].

* cited by examiner

SEALING CORNER BRACKET AND CABINET INCLUDING CORNER BRACKET

PRIORITY APPLICATIONS

This application is a continuation of U.S. application Ser. No. 17/030,908, filed on Sep. 24, 2020, now U.S. Pat. No. 11,857,074, which is a continuation of International Application No. PCT/US19/24908, filed on Mar. 29, 2019, which claims the benefit of priority to U.S. Application No. 62/652,708, filed on Apr. 4, 2018, the content of which is relied upon and incorporated herein by reference in entirety.

BACKGROUND

This disclosure relates to cabinets, and more particularly, to cabinets for housing equipment and including corner brackets for providing structural support and resistance to entry of dust, dirt, and/or fluid between the corner brackets and frame members of the cabinet.

Cabinets may be used to enclose and protect equipment, such as, for example, fiber optic equipment associated with fiber optic cables including optical fibers. For example, fiber optic equipment may be enclosed in cabinets and provide connections and circuitry for facilitating broadband voice, video, and data transmission. One example of a cabinet for enclosing fiber optic equipment is a fiber optic distribution outdoor cabinet, some of which may be intended to be installed in an outdoor environment exposed to the elements. In order to substantially prevent moisture and dust from the environment from entering the interior of the cabinet, some cabinets include a seamless single-piece shell. However, cabinets formed in such a manner may exhibit a number of possible drawbacks. For example, due at least in part to the single-piece shell construction, such cabinets are not scalable, and thus, cannot be easily assembled or modified in the field to increase (or reduce) the size of the cabinet to tailor the cabinet to meet the capacity requirements of the equipment being enclosed therein. Thus, it may be necessary to manufacture such cabinets in a large number of different sizes to meet the needs for different installations, which may result in manufacturing and inventory inefficiencies. In addition, larger cabinets needed to meet large capacity requirements may be cumbersome to transport and install due to their large size and weight. Further, it may be difficult to repair or replace damaged portions of the cabinet due, at least in part to having a single-piece construction and/or the possible need to disconnect any cables entering the cabinet when repairing the cabinet, which may result in additional complexity and expense.

Some examples described herein may address one or more of these possible drawbacks.

SUMMARY

The present disclosure is generally directed to a corner bracket. The corner bracket may include a structural portion including at least one first material, and a sealing portion including at least one second material. In some examples, the at least one first material may be relatively more rigid than the at least one second material, and the at least one second material may be relatively more elastic than the at least one first material. The corner bracket may also include a first receiver defining a first longitudinal axis and configured to receive an end of a first frame member. In some examples, the first receiver may include a first retainer portion configured to be coupled to the end of the first frame member, and a first sealing interface configured to provide a substantially fluid-resistant seal between a portion of the end of the frame member and the first receiver. The corner bracket may also include a second receiver defining a second longitudinal axis transverse to the first longitudinal axis of the first receiver and configured to receive an end of a second frame member. In some examples, the second receiver may include a second retainer portion configured to be coupled to the end of the second frame member, and a second sealing interface configured to provide a substantially fluid-resistant seal between a portion of the end of the second frame member and the second receiver. The structural portion may include the first retainer portion and the second retainer portion, and the sealing portion may include the first sealing interface and the second sealing interface.

This disclosure is also generally directed to a corner joint. The corner joint may include a first frame member defining a first longitudinal frame member axis, and a second frame member defining a second longitudinal frame member axis. The corner joint may also include a corner bracket coupling the first frame member and the second frame member to one another, such that the first frame member longitudinal axis and the second frame member longitudinal axis are transverse with respect to one another. In some examples, the corner bracket may include a structural portion including at least one first material, and a sealing portion including at least one second material different than the at least one first material. The corner bracket may also include a first receiver defining a first longitudinal axis and receiving an end of the first frame member. In some examples, the first receiver may include a first retainer portion coupled to the end of the first frame member, and a first sealing interface configured to provide a substantially fluid-resistant seal between a portion of the end of the first frame member and the first receiver. The corner bracket may also include a second receiver defining a second longitudinal axis transverse to the first longitudinal axis of the first receiver and configured to receive an end of the second frame member. In some examples, the second receiver may include a second retainer portion coupled to the end of the second frame member, and a second sealing interface configured to provide a substantially fluid-resistant seal between a portion of the end of the second frame member and the second receiver.

This disclosure is also generally directed to a cabinet defining an interior and an exterior. The cabinet may include a frame and a plurality of panels coupled to the frame to define an interior and an exterior of the cabinet. The frame may include a plurality of frame members and a plurality of corner brackets coupling at least some of the plurality of frame members to one another. At least one of the plurality of corner brackets may include a structural portion including at least one first material, and a sealing portion including at least one second material different than the at least one first material. At least one of the plurality of corner brackets may also include a first receiver defining a first longitudinal axis and receiving an end of a first one of the plurality of frame members. In some examples, the first receiver may include a first retainer portion coupled to the end of the first one of the plurality of frame members, and a first sealing interface configured to provide a substantially fluid- and/or dust-resistant seal between a portion of the end of the first one of the plurality of frame members and the first receiver. The at least one corner bracket may also include a second receiver defining a second longitudinal axis transverse to the first longitudinal axis of the first receiver and configured to receive an end of a second one of the plurality of frame members. In some examples, the second receiver may include a second retainer portion coupled to the end of the second one of the plurality of frame members, and a second sealing interface configured to provide a substantially fluid- and/or dust-resistant seal between a portion of the end of the second one of the plurality of frame members and the second receiver.

DETAILED DESCRIPTION

Figure 1:
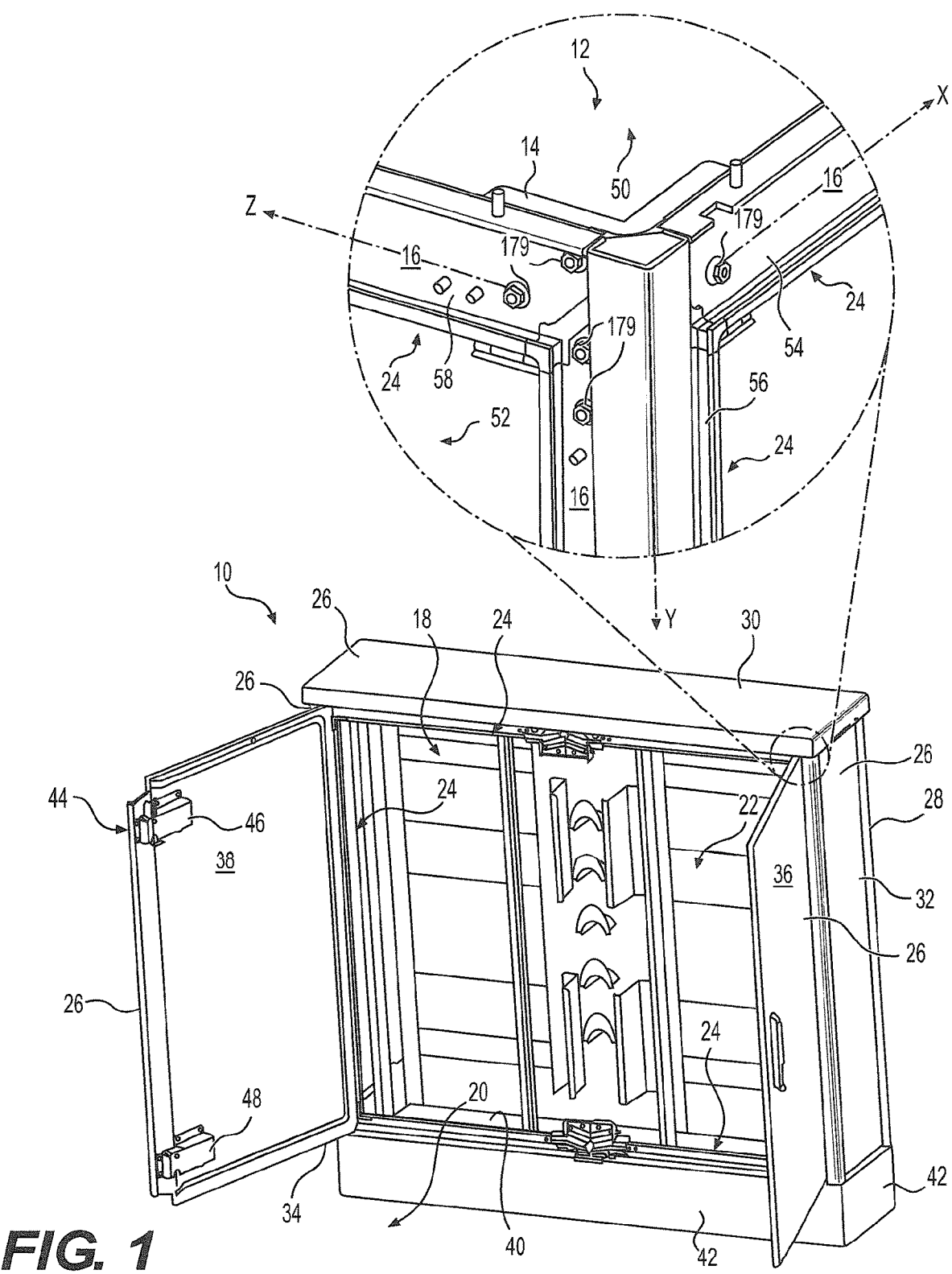
FIG. 1 is a schematic perspective view of an example cabinet including a detailed perspective view of an example corner joint including an example corner bracket coupling three example frame members to one another.

Reference will now be made in detail to embodiments, examples of which are illustrated in the accompanying drawings. Whenever possible, the same reference numbers are used throughout the drawings to refer to the same or like parts.

This disclosure is generally directed to cabinets, such as, for example, cabinets for housing equipment and including corner brackets for providing structural support and fluid resistance between the corner brackets and frame members of the cabinet. According to some examples, the cabinets described herein may be assembled on site and may be scalable to meet the capacity requirements of the equipment being enclosed by the cabinet. For example, some examples of the cabinet may be formed by a frame assembled from frame members coupled to one another by brackets. The frame members may be provided (or modified on-site) to build a frame (e.g., off-site or on-site) defining the desired interior dimensions, and the brackets may be used to couple the frame members to one another. Thereafter, panels may be attached to the frame to create the cabinet. In some examples, one or more of the panels may be pivotally coupled to the frame to provide one or more doors configured to pivot between open and closed positions.

In some examples, the equipment to be enclosed in the cabinet may be assembled and/or coupled to the interior of the cabinet during and/or after completion of assembly of the cabinet. In some examples, the corner brackets may provide both structural support for securely coupling two or more frame members to one another (e.g., rigidly coupling them to one another) and a substantially-fluid resistant seal (e.g., a fluid-tight seal) between the corner bracket and the two or more frame members and, in some examples, between the bracket and the panels of the cabinet. Some examples may also at least partially provide a cabinet that is scalable to tailor its exterior size and/or interior size to meet the capacity needs of a particular installation due to the cabinet being formed as a frame with panels secured thereto, as compared to a cabinet including a monolithic shell having a size that cannot be easily altered. For example, brackets such as at least some of the example corner brackets disclosed herein may be used with frame members having different lengths (or different combinations of frame members and brackets) to create cabinets having different dimensions to meet the capacity needs of a particular installation. In addition, some examples may provide an ability to repair and/or replace portions of a cabinet, for example, by removing one or more of the panels from the frame and repairing and/or replacing the portions of the cabinet desired to be replaced and/or repaired. In addition, if the future requirements of a particular installation change, such that, for example, a larger interior space is desired to meet greater interior capacity requirements, some examples may provide the ability to be modified to increase the size of cabinet, for example, by removing some of the exterior panels, increasing the size of the frame to the desired size using frame members and brackets, and installing panels onto the modified frame to create a cabinet having the desired interior capacity.

FIG. 1 is a schematic perspective view of an example cabinet 10 including a detailed perspective view of an example corner joint 12 including an example corner bracket 14 coupling three example frame members 16 to one another. The example cabinet 10 shown in FIG. 1 is a cabinet 10 for enclosing fiber optic equipment, such as fiber optic cables including optical fibers, and connections and circuitry for facilitating broadband voice, video, and data transmission. In some examples, the cabinet may be a fiber optic distribution outdoor cabinet, which may be intended to be installed in an outdoor environment exposed to the elements. Other types of cabinets for enclosing other types of equipment are contemplated.

As shown in FIG. 1, the example cabinet 10 defines an interior 18 and an exterior 20. In the example shown, the interior 18 includes various structures 22 known to those skilled in the art for facilitating routing and/or connection of fiber optic cables including optical fibers (not shown for clarity). The example cabinet 10 shown includes a frame 24 and a plurality of exterior panels 26 secured to the frame 24 for enclosing the interior 18 of the cabinet 10. For example, the cabinet 10 includes a back panel 28 coupled to a back side of the frame 24, a top panel 30 coupled to a top side of the frame 24, a first side panel 32 coupled to a first side of the frame 24, a second side panel 34 coupled to a second side of the frame 24 opposite the first side panel 32, a first door panel 36 coupled to a front side of the frame 24, such that it pivots with respect to the frame 24, and a second door panel 38 coupled to a front side of the frame 24, such that it pivots with respect to the frame 24. In some examples, the cabinet 10 also includes a bottom panel 40 coupled to a bottom side of the frame 24. In some examples, the bottom panel 40 may include apertures (not shown for clarity) facilitating entry of cables, such as, for example, fiber optic cables, into the interior 18 of the cabinet 10. The example shown also includes a skirt 42 coupled to and extending around the periphery of the bottom of the frame 24, which provides protection for cables entering the interior 18 of the cabinet 10 through the bottom panel 40.

As shown in FIG. 1, one or more of the first door panel 36 or the second door panel 38 may include a latch assembly 44 for securing the first and/or second door panels 36 and 38 in the closed position. In the example shown, the latch assembly 44 includes an upper latch mechanism 46 and a lower latch mechanism 48, each including a keeper (not shown) configured to selectively engage a respective upper member of the frame 24 and lower member of the frame 24. Although FIG. 1 shows the latch assembly 44 coupled to an interior side of the second door panel 38, in some examples, a second latch mechanism may be coupled to the interior side of the first door panel 36.

As shown in FIG. 1, the frame 24 includes frame members 16 coupled to one another via brackets, such as, for example, the example corner bracket 14 shown. The example corner bracket 14 defines an interior side 50 and an exterior side 52 and is configured to couple a first frame member 54 (e.g., a first cross member) having a first longitudinal axis X, a second frame member 56 (e.g., an upright) having a second longitudinal axis Y, and a third frame member 58 (e.g., a second cross member) having a third longitudinal axis Z to one another, for example, such that the longitudinal axes X, Y, and Z are mutually transverse to one another (e.g., substantially mutually orthogonal to one another).

Figure 2:
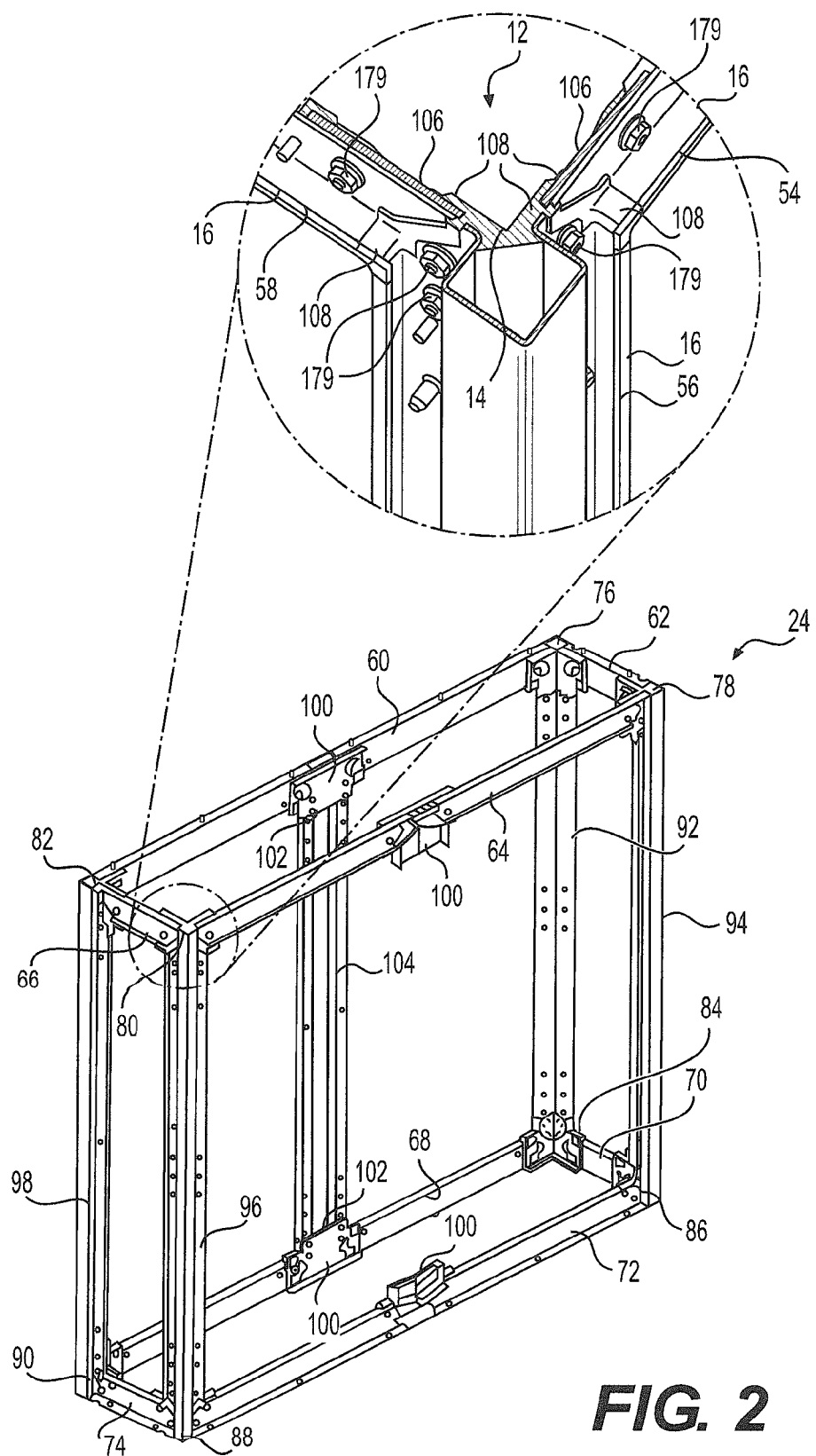
FIG. 2 is a schematic perspective view of an example frame of a cabinet including a detailed perspective partial section view of an example corner joint.

FIG. 2 is a schematic perspective view of an example frame 24 for a cabinet 10 including a detailed perspective partial section view of an example corner joint 12. As shown in FIG. 2, the frame 24 may include an upper back frame member 60, an upper first side frame member 62, an upper front frame member 64, an upper second side frame member 66 opposite the upper first side frame member 62, a lower back frame member 68, a lower first side frame member 70, a lower front frame member 72, and a lower second side frame member 74 opposite the lower first side frame member 70. The example frame 24 also includes a first upper corner bracket 76 coupling the upper back frame member 60 and the upper first side frame member 62 to one another, a second upper corner bracket 78 coupling the upper first side frame member 62 and the upper front frame member 64 to one another, a third upper corner bracket 80 coupling the upper front frame member 64 and the upper second side frame member 66 to one another, and a fourth upper corner bracket 82 coupling the upper second side frame member 66 and the upper back frame member 60 to one another. The example frame 24 further includes a first lower corner bracket 84 coupling the lower back frame member 68 and the lower first side frame 70 member to one another, a second lower corner bracket 86 coupling the lower first side frame member 70 and the lower front frame member 72 to one another, a third lower corner bracket 88 coupling the lower front frame member 72 and the lower second side frame member 74 to one another, and a fourth lower corner bracket 90 coupling the lower second side frame member 74 and the lower back frame member 68 to one another.

In the example shown in FIG. 2, the frame 24 also includes a first corner frame member 92 (e.g., an upright) coupling the first upper corner bracket 76 and the first lower corner bracket 84 to one another, a second corner frame member 94 (e.g., an upright) coupling the second upper corner bracket 78 and the second lower corner bracket 86 to one another, a third corner frame member 96 (e.g., an upright) coupling the third upper corner bracket 80 and third lower corner bracket 88 to one another, and a fourth corner frame member 98 (e.g., an upright) coupling the fourth upper corner bracket 82 and the fourth lower corner bracket 90 to one another.

The example shown also includes brackets 100 in the upper and lower front frame members 64 and 72, and brackets 101 in the upper and lower back frame members 60 and 68. The brackets 100 and/or 101 may serve to increase the length of the frame 24, provide coupling points 102 for additional frame members, such as frame member 104, and/or provide structural support and/or fluid-resistant sealing structures (e.g., fluid-tight sealing structures) for one or more of the first door panel 36 and the second door panel 38. Use of brackets such as the brackets 100 and/or 101 may facilitate expanding the length of the frame 24. In some examples, although not shown, brackets similar to the brackets 100 and/or 101 may be used to facilitate increasing the height of the frame 24 by incorporating such brackets into the corner frame members. Such brackets may facilitate increasing the size of the cabinet, (e.g., on-site) without replacing the entire cabinet.

In the example shown in FIG. 2, one or more of the corner brackets (e.g., all of the corner brackets) may include a structural portion 106 including at least one first material, and a sealing portion 108 including at least one second material different than the at least one first material. In some examples, the at least one first material is relatively more rigid than the at least one second material, and the at least one second material is relatively more elastic than the at least one first material. For example, the at least one first material may be sufficiently rigid to rigidly secure the frame members 16 to one another, such that the frame 24 provides a structural support to which the panels 26 of the cabinet 10 (see FIG. 1) may be secured. In some examples, it may be desirable for the frame 24 to be sufficiently rigid to support the weight of the cabinet 10 and the equipment enclosed therein, and/or to prevent flexing of the frame 24 sufficient to compromise a substantially fluid- and/or dust-resistant seal (e.g., a fluid-tight seal) between the frame 24 and the panels 26 coupled to the frame 24. In some examples, the at least one first material may include one or more of steel, stainless steel, aluminum, titanium, fiber reinforced plastic, carbon fiber, or any other suitable strong and rigid material(s). In some examples, the at least one second material may be sufficiently elastic to provide a substantially fluid-resistant seal (e.g., a fluid-tight seal) between the corner brackets 14 and the frame members 16. In some examples, the at least one second material may include one or more of natural and/or synthetic rubbers and plastics.

Figure 3:
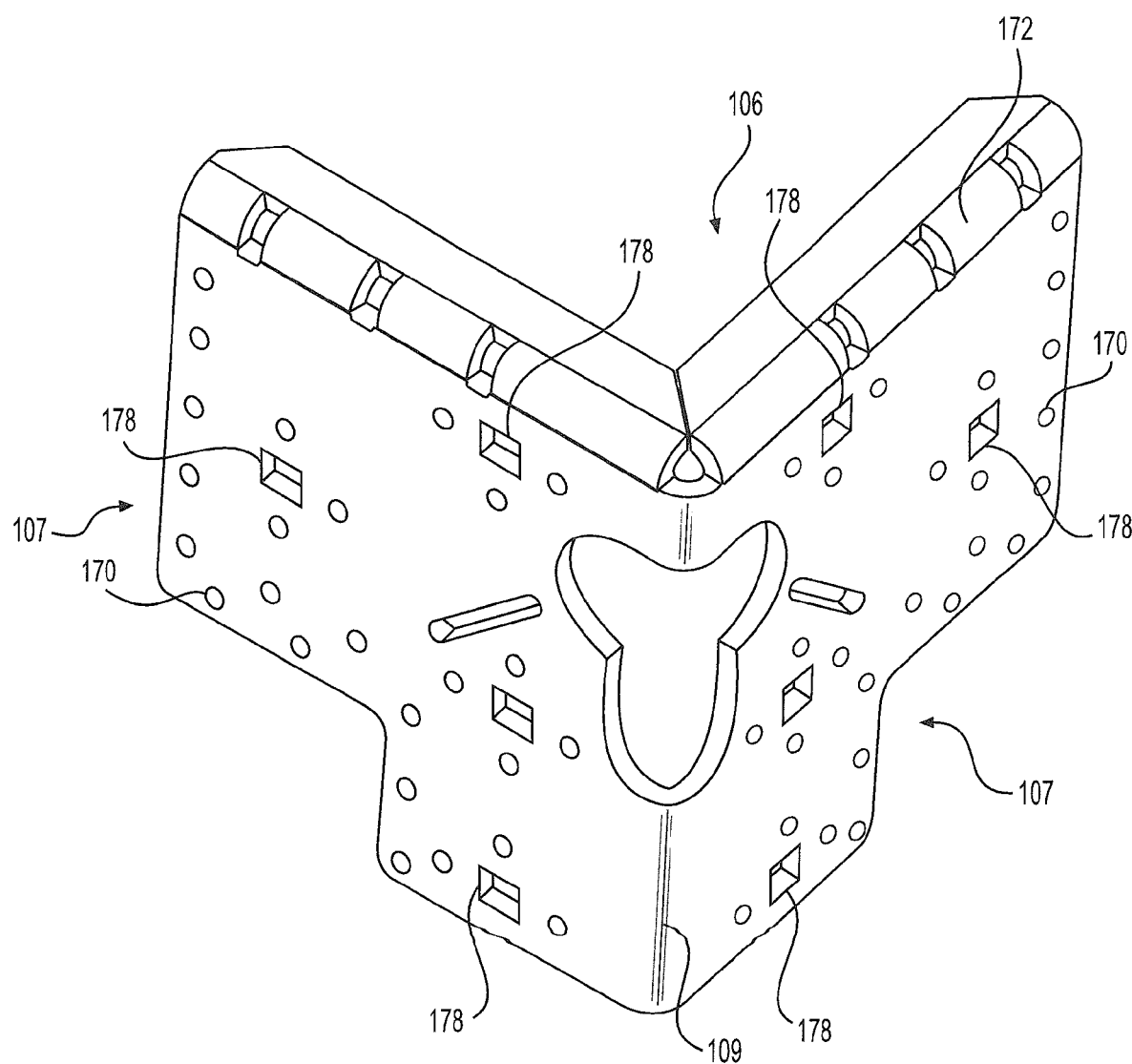
FIG. 3 is a schematic perspective view of an example structural portion of an example corner bracket.

In some examples, the structural portion 106 is formed as a single unitary piece, for example, as shown in FIG. 3. In the example shown in FIG. 3, the structural portion 106 exhibits substantial bi-lateral symmetry with two halves 107 coupled to one another at a bend 109.

Figure 4:
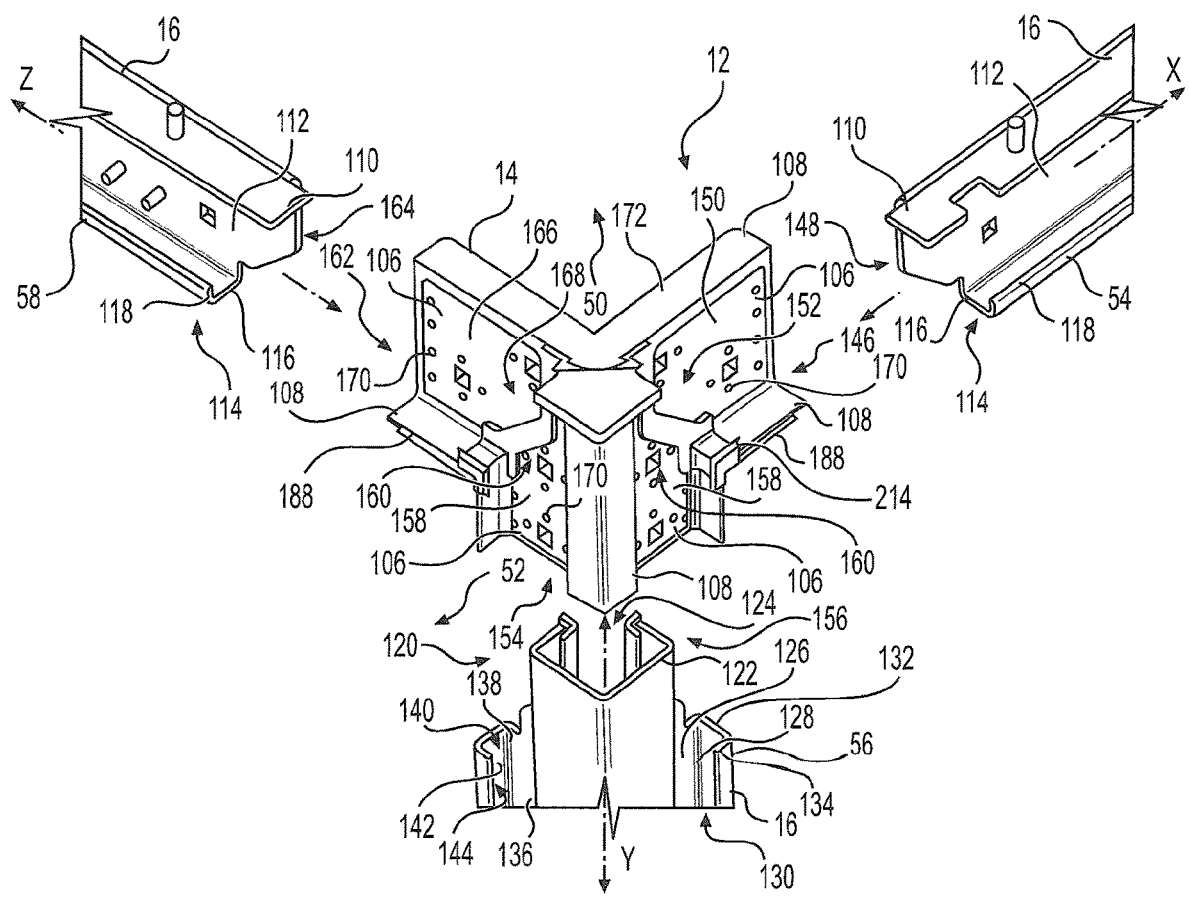
FIG. 4 is a schematic perspective exploded view of an example corner joint including an example corner bracket configured to couple three example frame members to one another.

FIG. 4 is a schematic perspective exploded view of an example corner joint 12 including an example corner bracket 14 coupling three example frame members 16 to one another to form a corner joint 12. For example, the frame members 16 include a first frame member 54, a second frame member 56, and a third frame member 58 defining respective longitudinal axes X, Y, and Z that are mutually transverse to one another (e.g., substantially mutually orthogonal to one another) when coupled to the example corner bracket 14. In the example shown, the first frame member 54 and the third frame member 58 have substantially the same cross-section (e.g., the same size and/or shape taken orthogonal with respect to the respective longitudinal axes X and Z). For example, each of the first and third frame members 54 and 58 includes an upper flange 110 (e.g., a substantially planar flange) configured to extend toward the exterior side 52 of the corner bracket 14 when coupled to the corner bracket 14. Each of the first and third frame members 54 and 58 also includes a web 112 (e.g., a substantially planar web) configured to extend transverse to (e.g., substantially orthogonal to) the upper flange 110, and a lower channel 114 configured to extend away from the exterior side 52 of the corner bracket 14 when coupled to the corner bracket 14, for example, in a direction substantially parallel to the upper flange 110. In the example shown, the lower channel 114 includes a trough 116 (e.g., a substantially planar trough) extending from the web 112 and terminating with a lip 118 that extends transverse to the trough 116 (e.g., substantially orthogonal to the trough 116). In the example shown, the web 112, the trough 116, and the lip 118 form a channel configured to provide a fluid passage between the web 112 and the lip 118.

The example second frame member 56 (e.g., an upright) defines a cross-section 120 (e.g., taken orthogonal with respect to the longitudinal axis Y) including a modified box section 122. In some examples, the box section 122 includes a substantially rectangular (e.g., square) cross-section with one corner 124 of the cross-section 120 being open. Adjacent the open corner 124, in some examples, the cross-section 120 includes a first flange 126 extending substantially transverse to (e.g., orthogonal to) the side 128 from which the first flange 126 extends, which, in the example shown, is substantially parallel to the longitudinal axis X of the first frame member 54. The cross-section 120 also includes a lateral channel 130 configured to extend transverse to the exterior side 52 of the corner bracket 14 when coupled to the corner bracket 14, for example, in a direction substantially parallel to the longitudinal axis Z of the third frame member 58 when coupled to the corner bracket 14. In the example shown, the cross-section 120 includes a lateral trough 132 (e.g., a substantially planar lateral trough) extending from the first flange 126 and terminating with a lateral lip 134 that extends transverse to the lateral trough 132 (e.g., substantially orthogonal to the lateral trough 132). In the example shown, the first flange 126, the lateral trough 132, and the lateral lip 134 form a channel configured to provide a fluid passage between the first flange 126 and the lateral lip 134.

In some examples, such as the example second frame member 56 shown in FIG. 4, the cross-section 120 has bi-lateral symmetry. For example, the cross-section 120 also includes, adjacent the open corner 124 and opposite the first flange 126, a second flange 136 extending substantially transverse to (e.g., orthogonal to) the second side 138 from which the second flange 136 extends, which, in the example shown, is substantially parallel to the longitudinal axis Z of the third frame member 58. The cross-section 120 also includes a second lateral channel 140 configured to extend transverse to the exterior side 52 of the corner bracket 14 when coupled to the corner bracket 14, for example, in a direction substantially parallel to the longitudinal axis X of the first frame member 54 when coupled to the corner bracket 14. In the example shown, the cross-section 120 includes a second lateral trough 142 (e.g., a substantially planar lateral trough) extending from the second flange 136 and terminating with a second lateral lip 144 that extends transverse to the second lateral trough 142 (e.g., substantially orthogonal to the second lateral trough 142). In the example shown, the second flange 136, the second lateral trough 142, and the second lateral lip 144 form a channel configured to provide a fluid passage between the second flange 136 and the second lateral lip 144.

Although the corner bracket 14, the first frame member 54, the second frame 56, and the third frame member 58 and related structures are sometimes described herein including terminology related to upper, lower, and lateral relationships, which may imply absolute relative orientations and/or relationships, these descriptions should not be interpreted in a manner to necessarily require absolute relationships, but rather, they should be interpreted in manner consistent with relative orientations and relationships.

Figure 5:
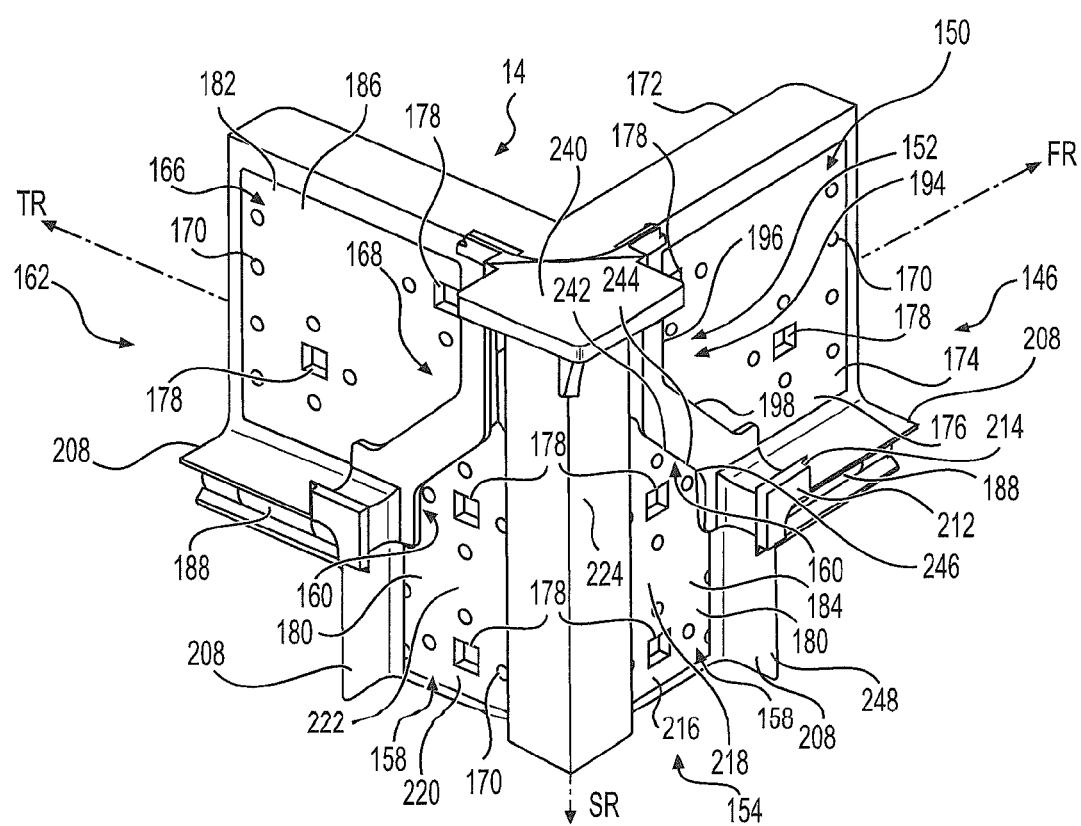
FIG. 5 is a schematic perspective view of an example corner bracket shown from an exterior side.

As shown in FIGS. 4 and 5, the example corner bracket 14 includes a first receiver 146 defining a first longitudinal axis FR and receiving an end 148 of the first frame member 54. In some examples, the first receiver 146 may include a first retainer portion 150 coupled to the end 148 of the first frame member 54, and a first sealing interface 152 configured to provide a substantially fluid-resistant seal (e.g., a fluid-tight seal) between a portion of the end 148 of the first frame member 54 and the first receiver 146. The example corner bracket 14 also includes a second receiver 154 defining a second longitudinal axis SR transverse to the first longitudinal axis FR of the first receiver 146 and configured to receive an end 156 of the second frame member 56. In some examples, the second receiver 154 may include a second retainer portion 158 coupled to the end 156 of the second frame member 56, and a second sealing interface 160 configured to provide a substantially fluid-resistant seal (e.g., a fluid-tight seal) between a portion of the end 156 of the second frame member 56 and the second receiver 154.

In some examples, the corner bracket 14 may further include a third receiver 162 defining a third longitudinal axis TR and configured to receive an end 164 of the third frame member 58. The third receiver 162 may include a third retainer portion 166 coupled to the end 164 of the third frame member 58, and a third sealing interface 168 configured to provide a substantially fluid-resistant seal (e.g., a fluid-tight seal) between a portion of the end 164 of the third frame member 58 and the third receiver 162. In some examples, the relative positions of the first frame member 54, the second frame member 56, and the third frame member 58 may be arranged differently than shown. For example, the third frame member 58 could instead be designated the second frame member, and the second frame member 56 could instead be designated the third frame member. In the example shown, the first longitudinal axis FR of the first receiver 146, the second longitudinal axis SR of the second receiver 154, and the third longitudinal axis TR of the third receiver 162 are mutually transverse with respect to one another. In some examples, they are mutually orthogonal with respect to one another.

As shown in FIGS. 4 and 5, the structural portion 106 may include one or more of the first retainer portion 150, the second retainer portion 158, or the third retainer portion 166. In some examples, the sealing portion 108 may include one or more of the first sealing interface 152, the second sealing interface 160, or the third sealing interface 168. In some examples, the sealing portion 108 may at least partially encase the structural portion 106. For example, the sealing portion 108 may be over-molded onto the structural portion 106. In some examples, such as the examples shown in FIGS. 4 and 5, the structural portion 106 may include a plurality of apertures 170 (see also FIG. 3) in which a portion of the at least one second material may be received, providing engagement (e.g., additional engagement) between the structural portion 106 and the sealing portion 108.

In the example shown in FIGS. 4 and 5, the corner bracket 14 also includes an inwardly extending flange 172 extending transverse with respect to the first receiver 146 and the second receiver 154. In some examples, the structural portion 106 and the sealing portion 108 may comprise the inwardly extending flange 172. In some examples, either the structural portion 106 or the sealing portion 108 may comprise the inwardly extending flange 172.

As shown in FIGS. 4 and 5, the first retainer portion 150 may include a first attachment portion 174 presenting an abutment surface 176 facing a direction transverse to the first longitudinal axis FR of the first receiver 146. In some examples, the first retainer portion 150 may include one or more holes 178 (see also FIG. 3) extending through the first attachment portion 174 configured to receive fasteners 179 (e.g., screws and/or bolts) (see FIGS. 1, 2, 7, 8, and 9) configured to secure the end 148 of the first frame member 54 to the first retainer portion 150. In some examples, one or more of the second retainer portion 158 or the third retainer portion 166 may include respective second and third attachment portions 180 and 182 presenting respective second and third abutment surfaces 184 and 186 facing a direction transverse to the respective second and third longitudinal axes SR and TR of the respective second and third receivers 154 and 162. In some examples, one or more of the second or third retainer portions 158 and 166 may include one or more holes 178 extending through the second and/or third attachment portions 180 and 182 configured to receive fasteners (e.g., screws and/or bolts) configured to secure the respective ends 156 and 164 of the second and third frame members 56 and 58 to the respective second and third retainer portions 158 and 166. In some examples, one or more of the holes 178 may have a square-shaped cross-section configured to engage with a complimentary portion of a carriage bolt (not shown). In some examples, devices and/or methods other than fasteners may be used to couple one or more of the first frame member 54, the second frame member 56, or the third frame member 58 to the corner bracket 14. In some examples, by attaching the frame members (e.g., directly) to the structural portion 106, the frame members may be rigidly coupled to one another, with the structural portion 106 substantially maintaining the relative angles and/or relative positions between the frame members.

As shown in FIG. 5, some corner brackets 14 may include one or more levels 188 coupled to the corner bracket 14. For example, the example corner bracket 14 shown in FIG. 5 includes two levels 188 (e.g., bubble levels) coupled to the first receiver 146 and the third receiver 162, such that the levels 188 may be used to level the corner bracket 14 (e.g., and the frame 24 attached thereto) in two transverse (e.g., orthogonal) planes.

Figure 6:
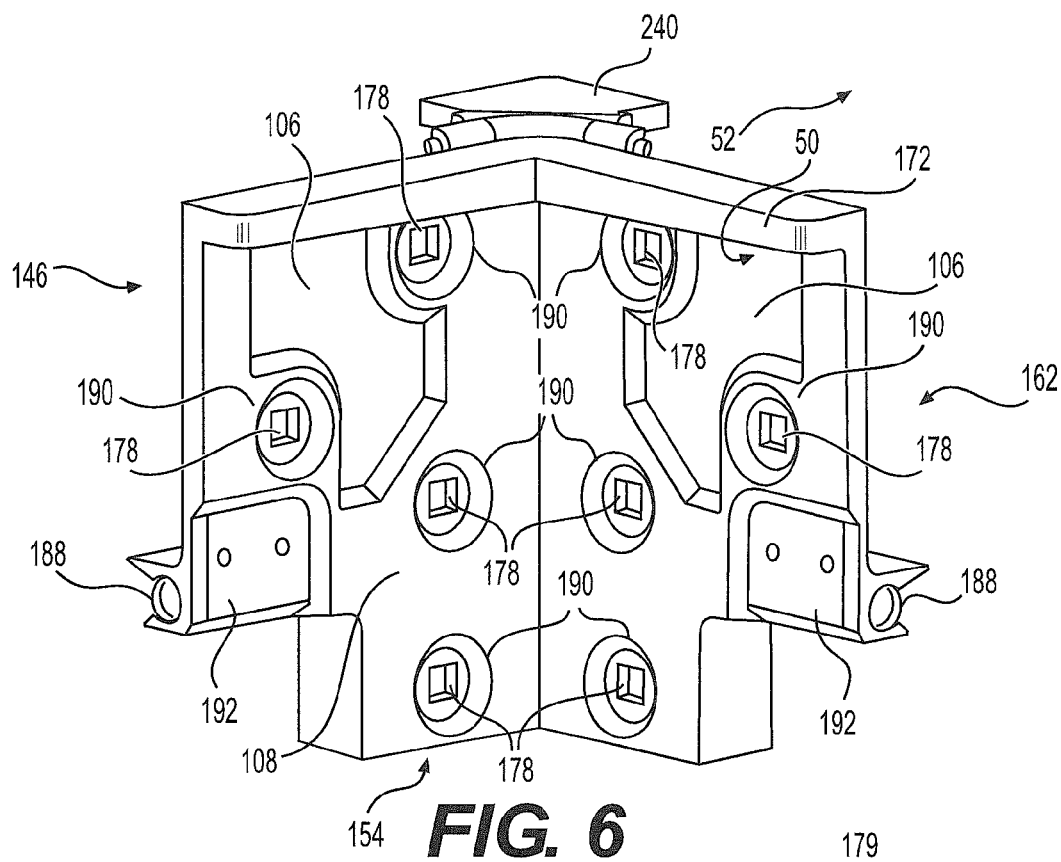
FIG. 6 is a schematic perspective view of the example corner bracket shown in FIG. 5 shown from an interior side.

As shown in FIG. 6, the example corner bracket 14 defines an interior side 50 and an exterior side 52, and the holes 178 may be surrounded on the interior side 50 by portions 190 of the sealing portion 108. Some such examples may result in providing a substantially fluid-resistant seal (e.g., a substantially fluid-tight seal) between the interior side 50 and the exterior side 52 of the corner bracket 14, even though the holes 178 for receiving fasteners pass from the interior side 50 to the exterior side 52 of the corner bracket 14.

As shown in FIG. 6, some examples of the corner bracket 14 may be configured such that the sealing portion 108 defines exposed latching surfaces 192 of the structural portion 106 on the interior side 50 devoid of the at least one second material of the sealing portion 108. The latching surfaces 192 may provide a rigid surface against which a portion of a latching assembly (e.g. a keeper) may abut.

Figure 7:
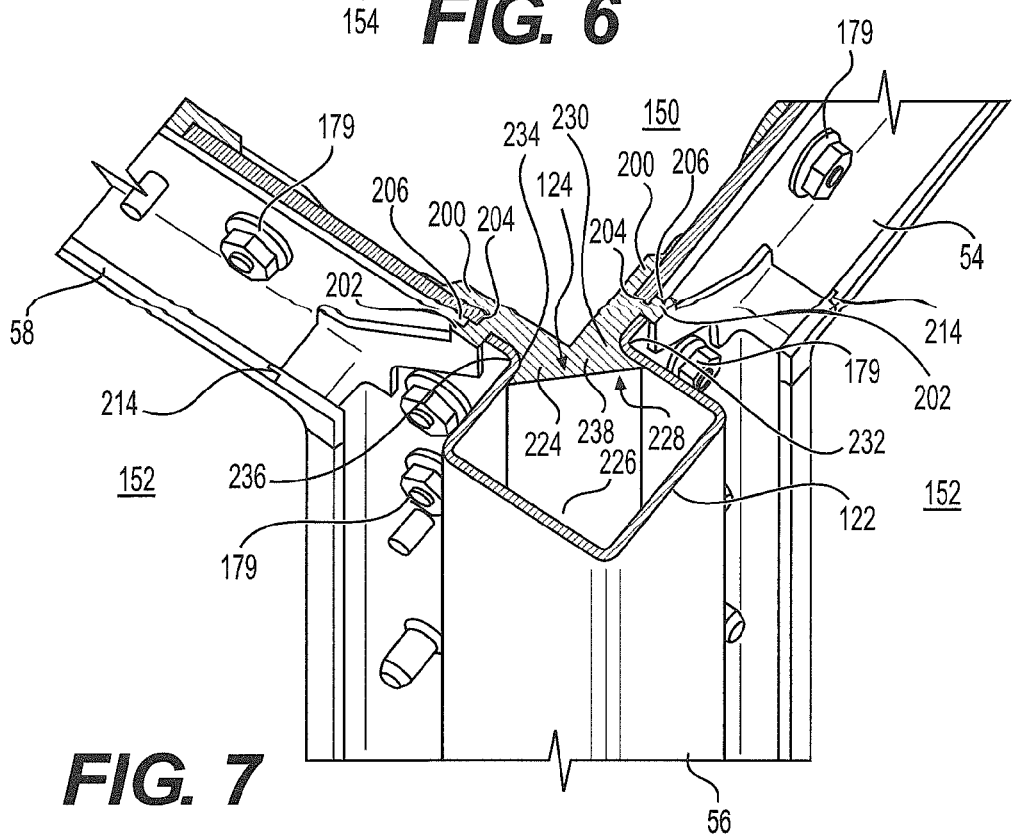
FIG. 7 is a schematic perspective section view of an example corner bracket.

Referring to FIGS. 5 and 7, in some examples, the first sealing interface 152 may include a seal stop 194 including a first seal stop portion 196 extending in a first direction transverse (e.g., orthogonal) to the first longitudinal axis FR of the first receiver 146. In some examples, the first sealing interface 152 may also include a second seal stop portion 198 extending in a second direction oblique with respect to the first direction. The first seal stop portion 196 and the second seal stop portion 198 present respective seal surfaces for providing a substantially fluid-resistant seal (e.g., a fluid-tight seal) between the first seal stop portion 196 and a first portion of the end 148 of the first frame member 54, and between the second seal stop portion 198 and a second portion of the end 148 of the first frame member 54. In some examples of the corner bracket 14, the second sealing interface 160 and/or the third sealing interface 168 may include respective first and/or second seal stop portions at least similar to the first seal stop portion 196 and second seal stop portion 198.

In some examples, for example, as shown in FIGS. 5 and 7, the first sealing interface 152 may include opposing fluid barriers 200 and 202 extending in a direction substantially parallel to the first longitudinal axis FR of the first receiver 146 and defining a pocket 204 configured to receive therein an edge portion 206 of the end 148 of the first frame member 54. In some examples, the pocket 204 and related structure may provide a relatively more reliable fluid-resistant seal between the corner bracket 14 and the first frame member 54. In some examples of the corner bracket 14, the second sealing interface 160 and/or the third sealing interface 168 may include respective fluid barriers forming respective pockets at least similar to the opposing fluid barriers 200 and 202 and pocket 204 formed in the first sealing interface 152.

As shown in FIGS. 4 and 5, the first sealing interface 152 may include a seal flange 208 extending in a first direction substantially transverse to the first longitudinal axis FR of the first receiver 146. In some examples, the seal flange 208 may be configured to be biased against a surface of the first frame member 54. For example, the seal flange 208 may be configured to be biased against the trough 116 and/or the lip 118 of the first frame member 54, which may provide a relatively more reliable fluid-resistant seal between the corner bracket 14 and the first frame member 54. In some examples of the corner bracket 14, the second sealing interface 160 and/or the third sealing interface 168 may include respective seal flanges at least similar to the seal flange 208 formed in the first sealing interface 152.

Figure 8:
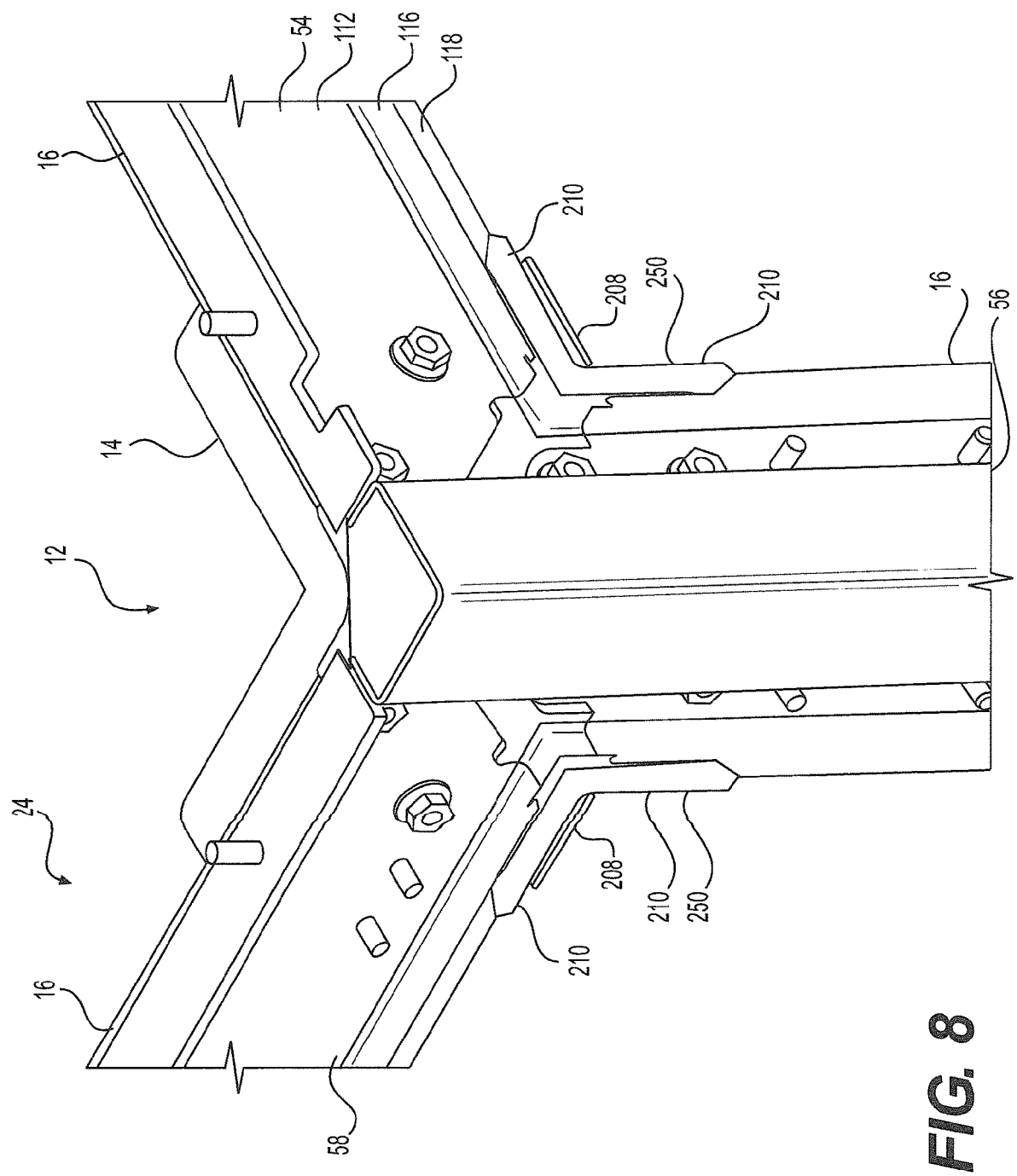
FIG. 8 is a schematic perspective view of another example corner joint, including another example corner bracket coupling three example frame members to one another.

FIG. 8 is a schematic perspective view of another example corner joint 12, including another example corner bracket 14 coupling three example frame members 16 to one another. As shown in FIG. 8, the first sealing interface 152 may also include a seal extension 210 extending from the seal flange 208 in the direction substantially parallel to the first direction and substantially transverse (e.g., orthogonal) to the seal flange 208, thereby defining a partial sleeve configured to receive therein a portion of the end 148 of the first frame member 54. For example, the seal flange 208 and the seal extension 210 may form a sleeve that wraps around the trough 116 and the lip 118 of the first frame member 54 on a side remote from the web 112 (e.g., on the underside of the trough 116 and the lip 118 when the first frame member 54 is an upper frame member). In some examples, the seal extension 210, when combined with the seal flange 208 may provide a relatively more reliable fluid-resistant seal between the corner bracket 14 and the first frame member

54. In some examples of the corner bracket 14, the second sealing interface 160 and/or the third sealing interface 168 may include respective seal extensions at least similar to the seal extension 210 formed in the first sealing interface 152.

As shown in FIGS. 5 and 7, some examples of the first sealing interface 152 may include a seal block 212 configured to abut a portion of an end surface of the first frame member 54, and in some examples, such as shown, a portion of an end surface of the second frame member 56. In some examples, the seal block 212 may be configured to present a continuation of the trough 116 and lip 118 of the first frame member 54, and/or a continuation of the lateral trough 132 and lateral lip 134 of the second frame member 56. In some examples, the seal block 212 may define one or more outboard recesses 214 configured to provide an overlapping interface with one or more of the lip 118 of the first frame member 54 or the lateral lip 134 of the second frame member 56, which may provide a relatively more reliable fluid-resistant seal between the seal block 212 and the first frame member 54 and/or the second frame member 56.

As shown in FIGS. 4, 5, and 7, some examples of the corner bracket 14 may include a second retainer portion 158 that includes a first lateral attachment portion 216 presenting a first lateral abutment surface 218, and a second lateral attachment portion 220 coupled to the first lateral abutment surface 218 and presenting a second lateral abutment surface 222. In some examples, the first lateral abutment surface 218 defines a first plane and the second lateral abutment surface 222 defines a second plane, and the first plane and the second plane are orthogonal with respect to one another, for example, as shown in FIG. 5. In some examples, the first lateral attachment portion 216 and the second lateral attachment portion 220 provide bi-lateral symmetry, for example, as shown in FIG. 5. In the examples shown, the first lateral attachment portion 216 and the second lateral attachment portion 220 each include one or more holes 178 configured to receive fasteners (not shown) configured to couple the second frame member 56 to the second retainer portion 158.

In some examples, for example, as shown in FIGS. 4 and 7, the second sealing interface 160 of the second receiver 154 may include a seal rail 224 configured to be received in a cavity 226 defined by, for example, the box section 122 of the second frame member 56. For example, the seal rail 224 may define a cross-section 228 including a first corner recess 230 configured to receive a first corner portion 232 of the box section 122 of the second frame member 56, and a second corner recess 234 configured to receive a second corner portion 236 of the box section 122 of the second frame member 56. The seal rail 224, in some examples, may also include a key section 238 between first corner recess 230 and second corner recess 234 and configured to be received in the cavity 226 of the second frame member 56. In some examples, the seal rail 224 may serve to register the second receiver 154 with the second frame member and provide a substantially fluid-resistant seal (e.g., a fluid-tight seal) between portions of the second frame member 56 (e.g., the box section 122) and the corner bracket 14. In some examples, a seal cap 240 (see, e.g., FIG. 5) may be provided at the end of the seal rail 224 to provide a substantially fluid-resistant seal (e.g., a fluid-tight seal) between an end of the box section 122 and the second sealing interface 160 of the corner bracket 14.

As shown in FIGS. 4 and 5, some examples of the corner bracket 14 may include a second sealing interface 160 that includes a second seal stop 242, including a first upright seal stop portion 244 extending in a first direction transverse to the second longitudinal axis SR of the second receiver 154, and a second upright seal stop portion 246 extending in a second direction oblique with respect to the first direction. In some examples, the first upright seal stop portion 244 and the second upright seal stop portion 246 present respective seal surfaces for providing a substantially fluid-resistant seal (e.g., a fluid-tight seal) between the first upright seal stop portion 244 and a first portion of the end 156 of the second frame member 56, and between the second upright seal stop portion 246 and a second portion of the end 156 of the second frame member 56.

As shown in FIG. 5, some examples of the corner bracket 14 may include a second sealing interface 160 that includes an upright seal flange 248 extending in a direction substantially parallel to the second longitudinal axis SR of the second receiver 154. In some examples, the upright seal flange 248 may be configured to be biased against a surface of the second frame member 56. In some examples, for example as shown in FIG. 8, the second sealing interface 160 may also include an upright seal extension 250 extending from the upright seal flange 248 in the direction substantially parallel to the second longitudinal axis SR of the second receiver 154 and substantially transverse (e.g., orthogonal) to the upright seal flange 248, thereby defining a partial sleeve configured to receive therein a portion of the end 156 of the second frame member 56.

In some examples, the second sealing interface 160 has substantial bi-lateral symmetry. In such examples, such as shown in FIG. 5, the first upright seal stop portion 244, the second upright seal stop portion 246, the upright seal flange 248, and the upright seal extension 250 (see FIG. 8) are substantially repeated on both sides of the seal rail 224.

Figure 9:
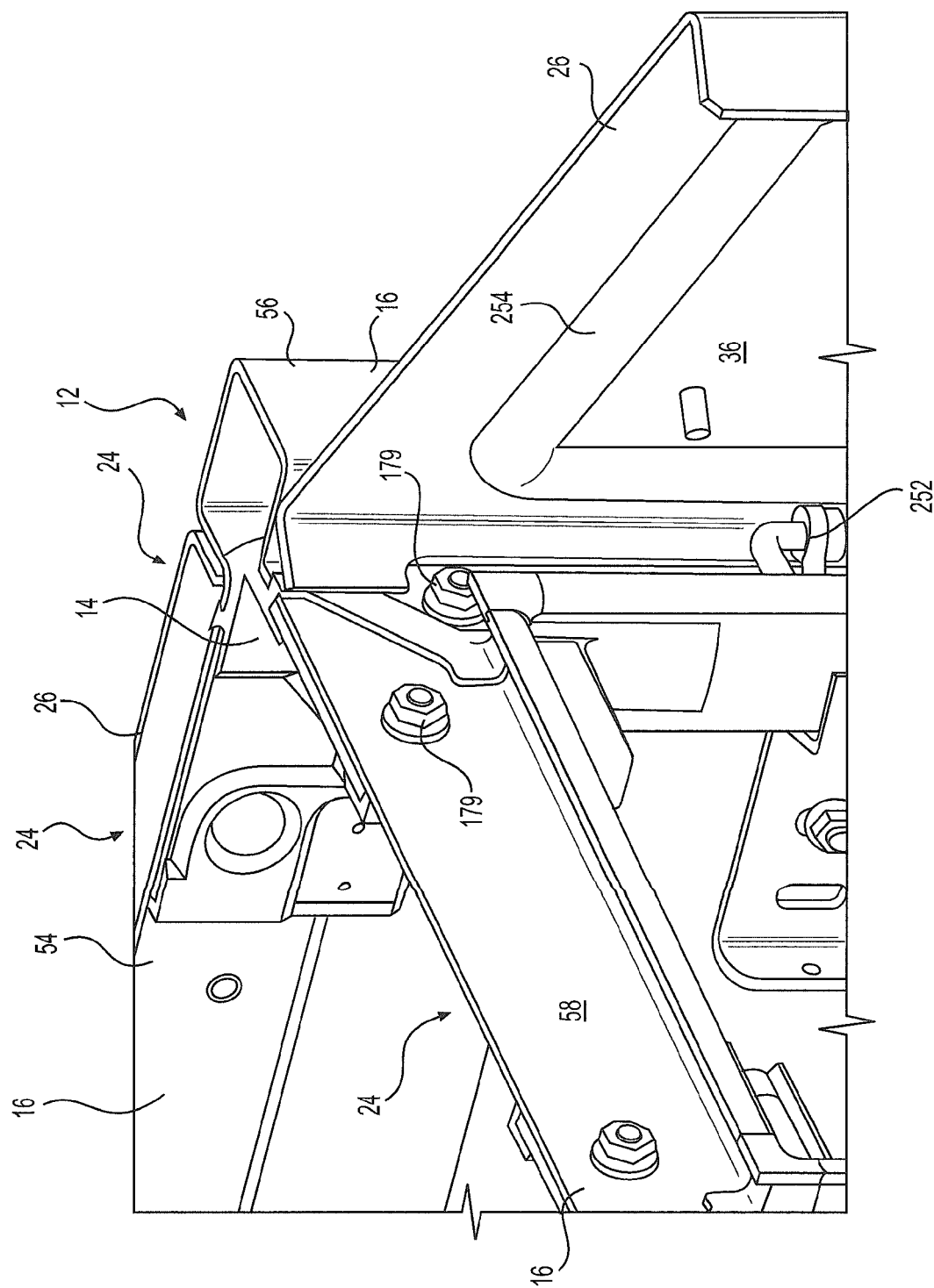
FIG. 9 is a schematic perspective view of a portion of an example cabinet including an example corner bracket, three example frame members, and an example door panel of the cabinet.

FIG. 9 is a schematic perspective view of a portion of an example cabinet 10 including an example corner bracket 14, three example frame members 16, and an example door panel 36 of the cabinet 10. In the example shown in FIG. 9, the door panel is shown in an open orientation relative to the third fame member 58. In the example shown, a hinge structure 252 is coupled to second frame member 56 and pivotally supports the door panel 36 relative to the second frame member 56. Some examples may include more than a single hinge structure 252. In the example shown, the interior side of the door panel 36 includes a raised seal 254 extending at least partially (e.g., fully) around an interior periphery of the door panel 36. The raised seal 254 is configured such that when the door panel 36 is in the closed orientation relative to the frame 24, the raised seal 254 presses against the respective lips 118 and/or lateral lips 134 of the frame members 54, 56, and/or 58 of the frame 24, thereby providing a substantially fluid-resistant seal (e.g., a fluid-tight seal) between the door panel 36 and the frame 24 when the door panel is closed. In an at least similar manner, other panels of the cabinet 10 may each include a raised seal at least similar to the raised seal 254, for example, such that when the panel is coupled to the frame 24 a substantially fluid-resistant seal (e.g., a fluid-tight seal) is provided between the respective panel and the frame 24. In addition, in some examples of the corner bracket 14, the sealing interface provides a substantially fluid-resistant seal (e.g., a fluid-tight seal) between the corner bracket 14 and the frame members coupled to one another at the corner bracket 14. Thus, even though the corner brackets 14 include a structural portion formed from a material sufficiently rigid and/or strong to provide the frame 24 with sufficient strength and/or dimensional integrity to support the panels, the one or more door panels, and the equipment enclosed in the cabinet, the sealing interface, formed from a relatively more elastic material substantially prevents fluid and/or dirt and dust from entering the interior 18 of the cabinet 10 when the one or more door panels is/are closed.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A corner bracket comprising:
a structural portion comprising at least one first material;
a sealing portion comprising at least one second material, wherein the at least one first material is relatively more rigid than the at least one second material, and the at least one second material is relatively more elastic than the at least one first material;
a first receiver defining a first longitudinal axis and configured to receive an end of a first frame member, the first receiver comprising:
a first retainer portion configured to be coupled to the end of the first frame member; and
a first sealing interface configured to provide a substantially fluid-resistant seal between a portion of the end of the first frame member and the first receiver;
a second receiver defining a second longitudinal axis transverse to the first longitudinal axis of the first receiver and configured to receive an end of a second frame member, the second receiver comprising:
a second retainer portion configured to be coupled to the end of the second frame member; and
a second sealing interface configured to provide a substantially fluid-resistant seal between a portion of the end of the second frame member and the second receiver,
wherein the structural portion comprises the first retainer portion and the second retainer portion, and
wherein the sealing portion comprises the first sealing interface and the second sealing interface;
wherein the structural portion comprises a plurality of apertures in which a portion of the at least one second material is received, providing engagement between the structural portion and the sealing portion.

2. The corner bracket of claim 1, further comprising a third receiver defining a third longitudinal axis and configured to receive an end of a third frame member, the third receiver comprising:
a third retainer portion configured to be coupled to the end of the third frame member; and
a third sealing interface configured to provide a substantially fluid-resistant seal between a portion of the end of the third frame member and the third receiver.

3. The corner bracket of claim 2, wherein the first longitudinal axis of the first receiver, the second longitudinal axis of the second receiver, and the third longitudinal axis of the third receiver are substantially orthogonal with respect to one another.

4. The corner bracket of claim 2, wherein the structural portion comprises the third retainer portion, and the sealing portion comprises the third sealing interface.

5. The corner bracket of claim 1, wherein the first sealing interface comprises a seal stop comprising:
a first seal stop portion extending in a first direction substantially orthogonal to the first longitudinal axis of the first receiver; and
a second seal stop portion extending in a second direction oblique with respect to the first direction,
wherein the first seal stop portion and the second seal stop portion present respective seal surfaces for providing a substantially fluid-resistant seal between the first seal stop portion and a first portion of the end of the first frame member and between the second seal stop portion and a second portion of the end of the first frame member.

6. The corner bracket of claim 1, wherein the first sealing interface comprises a seal flange extending in a first direction substantially parallel to the first longitudinal axis of the first receiver, the seal flange configured to be biased against a surface of the first frame member.

7. The corner bracket of claim 6, wherein the first sealing interface further comprises a seal extension extending from the seal flange in the direction substantially parallel to the first direction and substantially transverse to the seal flange, thereby defining a partial sleeve configured to receive therein a portion of the end of the first frame member.

8. The corner bracket of claim 1, wherein the first sealing interface comprises a seal block configured to abut a portion of an end surface of the first frame member.

9. The corner bracket of claim 1, wherein the second retainer portion comprises:
a first lateral attachment portion presenting a first lateral abutment surface; and
a second lateral attachment portion coupled to the first lateral abutment surface and presenting a second lateral abutment surface,
wherein the first lateral abutment surface defines a first plane and the second lateral abutment surface defines a second plane, and
wherein the first plane and the second plane are transverse with respect to one another.

10. The corner bracket of claim 9, wherein the first lateral attachment portion and the second lateral attachment portion provide bi-lateral symmetry.

11. The corner bracket of claim 9, wherein at least one of the first lateral attachment portion or the second lateral attachment portion comprises one or more holes configured to receive fasteners configured to couple the second frame member to the second retainer portion.

12. The corner bracket of claim 1, wherein the second sealing interface comprises:
a seal rail configured to be received in a cavity defined by the second frame member, the seal rail defining a cross-section comprising:
a first corner recess configured to receive a first corner portion of a cross-section of the second frame member;
a second corner recess configured to receive a second corner portion of the cross-section of the second frame member; and
a key section between first corner recess and second corner recess and configured to be received in the cavity.

13. The corner bracket of claim 1, wherein the second sealing interface comprises a second seal stop comprising:
a first upright seal stop portion extending in a first direction transverse to the second longitudinal axis of the second receiver; and
a second upright seal stop portion extending in a second direction oblique with respect to the first direction,
wherein the first upright seal stop portion and the second upright seal stop portion present respective seal surfaces for providing a substantially fluid-resistant seal between the first upright seal stop portion and a first portion of the end of the second frame member and between the second upright seal stop portion and a second portion of the end of the second frame member.

14. The corner bracket of claim 1, wherein the second sealing interface comprises an upright seal flange extending in a direction substantially parallel to the second longitudinal axis of the second receiver, the upright seal flange configured to be biased against a surface of the second frame member.

15. The corner bracket of claim 14, wherein the second sealing interface further comprises an upright seal extension extending from the upright seal flange in the direction substantially parallel to the second longitudinal axis of the second receiver and substantially transverse to the upright seal flange, thereby defining a partial sleeve configured to receive therein a portion of the end of the second frame member.

16. The corner bracket of claim 1, wherein the first retainer portion comprises:
a first attachment portion presenting an abutment surface facing a direction substantially orthogonal to the first longitudinal axis of the first receiver; and
one or more holes extending through the first attachment portion configured to receive fasteners configured to secure the end of the first frame member to the first retainer portion,
wherein the corner bracket defines an interior side and an exterior side, and wherein the one or more holes are surrounded on the interior side by portions of the sealing portion.

17. The corner bracket of claim 1, wherein the corner bracket defines an interior side and an exterior side, and wherein the sealing portion defines exposed latching surfaces on the interior side devoid of the second material of the sealing portion.

18. A corner bracket comprising:
a structural portion comprising at least one first material;
a sealing portion comprising at least one second material,
wherein the at least one first material is relatively more rigid than the at least one second material, and the at least one second material is relatively more elastic than the at least one first material;
a first receiver defining a first longitudinal axis and configured to receive an end of a first frame member, the first receiver comprising:
a first retainer portion configured to be coupled to the end of the first frame member; and
a first sealing interface configured to provide a substantially fluid-resistant seal between a portion of the end of the first frame member and the first receiver;
a second receiver defining a second longitudinal axis transverse to the first longitudinal axis of the first receiver and configured to receive an end of a second frame member, the second receiver comprising:
a second retainer portion configured to be coupled to the end of the second frame member; and
a second sealing interface configured to provide a substantially fluid-resistant seal between a portion of the end of the second frame member and the second receiver,
wherein the structural portion comprises the first retainer portion and the second retainer portion, and
wherein the sealing portion comprises the first sealing interface and the second sealing interface;
wherein the first sealing interface comprises opposing fluid barriers extending in a direction substantially parallel to the first longitudinal axis of the first receiver and defining a pocket configured to receive therein an edge portion of the end of the first frame member.

19. A corner bracket comprising:
a structural portion comprising at least one first material;
a sealing portion comprising at least one second material,
wherein the at least one first material is relatively more rigid than the at least one second material, and the at least one second material is relatively more elastic than the at least one first material;
a first receiver defining a first longitudinal axis and configured to receive an end of a first frame member, the first receiver comprising:
a first retainer portion configured to be coupled to the end of the first frame member; and
a first sealing interface configured to provide a substantially fluid-resistant seal between a portion of the end of the first frame member and the first receiver;
a second receiver defining a second longitudinal axis transverse to the first longitudinal axis of the first receiver and configured to receive an end of a second frame member, the second receiver comprising:
a second retainer portion configured to be coupled to the end of the second frame member; and
a second sealing interface configured to provide a substantially fluid-resistant seal between a portion of the end of the second frame member and the second receiver,
wherein the structural portion comprises the first retainer portion and the second retainer portion, and
wherein the sealing portion comprises the first sealing interface and the second sealing interface;
an inwardly extending flange extending transverse with respect to the first longitudinal axis of the first receiver and the second longitudinal axis of the second receiver.

20. The corner bracket of claim 19, wherein the structural portion and the sealing portion comprise the inwardly extending flange.

* * * * *